United States Patent
Afanasiev et al.

(10) Patent No.: US 6,899,570 B2
(45) Date of Patent: May 31, 2005

(54) HERMETICALLY SEALED TERMINAL FOR ELECTRICAL DEVICE

(75) Inventors: Michael E. Afanasiev, Bradenton, FL (US); Robert J. Evans, Bradenton, FL (US); Karl L. Kitts, Fairview, NC (US)

(73) Assignee: Eaton Corporation, Cleveland, OH (US)

( * ) Notice: Subject to any disclaimer, the term of this patent is extended or adjusted under 35 U.S.C. 154(b) by 18 days.

(21) Appl. No.: 10/440,602

(22) Filed: May 19, 2003

(65) Prior Publication Data

US 2004/0235363 A1 Nov. 25, 2004

(51) Int. Cl.[7] ............................................. H01R 13/42
(52) U.S. Cl. .................... 439/737; 439/551; 439/559
(58) Field of Search .................... 439/737, 550–551, 439/548, 559, 556, 271–275, 277, 587

(56) References Cited

U.S. PATENT DOCUMENTS

| 949,726 A | * | 2/1910 | Eden | 439/737 |
| 2,245,918 A | * | 6/1941 | Hobbs | 439/737 |
| 2,823,251 A | * | 2/1958 | Clark | 439/737 |

* cited by examiner

Primary Examiner—Renee Luebke
Assistant Examiner—Felix O. Figueroa
(74) Attorney, Agent, or Firm—Boyle Fredrickson Newholm Stein & Gratz S.C.

(57) ABSTRACT

A terminal contact assembly is provided for hermetically sealing the interior and the exterior of an electronic device. The terminal contact assembly includes a terminal contact extending through an opening in the housing of the electronic device. The terminal contact has an inner end within the interior of the electronic device and an outer end. A deformable seal is positioned about the terminal contact within the opening through the housing. An inner insulator is positioned within the interior of the electronic device adjacent the inner surface thereof and an outer insulator is positioned about the terminal contact adjacent the outer surface of the housing. A torque generating structure generates a deformable force on the seal such that the seal seals the opening through the housing.

15 Claims, 2 Drawing Sheets

HERMETICALLY SEALED TERMINAL FOR ELECTRICAL DEVICE

FIELD OF THE INVENTION

This invention relates generally to electromechanical parts, and in particular, to a hermetically sealed terminal for functionally linking the interior and the exterior of an electro-mechanical device particularly adapted for use in an aerospace vehicle.

BACKGROUND AND SUMMARY OF THE INVENTION

As is known, electromechanical parts are used for countless applications in a wide variety of environments. These electromechanical parts often contain electronic devices having electrical circuits that are sensitive to the environments in which the electromechanical parts are exposed. In order to protect the circuits, many electronic devices include housings for the circuits that hermetically seal the interiors of the electronic devices from the exteriors thereof so as to limit the exposure of the components of the electrical circuits to the environment. It can be appreciated that the electrical circuit within the housing of an electronic device must be functionally linked to electrical and/or mechanical parts outside of the housing by a terminal.

Heretofore, in order to hermetically seal an electronic device having a terminal extending through the housing thereof, the terminal would be either soldered or welded to the housing so as to prevent leakage into the device from about the terminal. However, the soldering or welding of the terminal to the housing of the electronic device has certain inherent weaknesses when the electronic device is used in an application such as an aerospace vehicle. By way of example, the solder or weld used to mount the terminal can be sensitive to the abrupt temperature changes that occur as the aerospace vehicle cycles between ground and a high altitude. As a result, cracks may occur in the solder or weld thereby resulting is a loss of the seal, a reduction of insulation resistance and a reduction of the dielectric withstanding voltage. In addition, the repeated expansion and contraction of the housing of the electronic device due to repeated pressure changes that occur as the aerospace vehicle cycles between ground and a high altitude may also cause the solder or weld to crack. This, in turn, exposes the electrical circuit within the housing to the external environment, which may cause the premature failure of the electrical circuit.

Therefore, it is a primary object and feature of the present invention to provide a terminal for an electronic device that hermetically seals the interior from the exterior thereof.

It is a further object and feature of the present invention to provide a terminal for an electronic device maintains its integrity when used in a wide range of environments.

It is a still further object and feature of the present invention to provide a terminal for an electronic device that less expensive and simple to mount to the housing of the electronic device.

In accordance with the present invention, a terminal contact assembly is provided for mounting to an electronic component defining an interior and exterior and having an opening therebetween. The contact assembly includes a terminal contact positionable within the opening of the electronic component. The terminal contact having inner and outer ends. A deformable o-ring is positioned about the terminal contact within the opening through the electronic component for hermetically sealing the interior of the electronic component.

The assembly further includes an inner insulator positioned within the interior of the electronic component adjacent the o-ring and an outer insulator extending about the terminal contact. The inner insulator includes an enlarged head positioned on the interior of the electronic component and a neck extending therefrom. The neck of the inner insulator is receivable in the opening of the electronic component. The terminal contact includes a radially extending disc projecting therefrom within the interior of the electronic component. A nut is threadable on the inner end of the terminal contact. The nut compresses the inner and outer insulators between the disc and the nut so as to generate a deforming force on the o-ring.

In accordance with a further aspect of the present invention, a terminal contact assembly is provided for mounting to an electronic component. The electronic component defines an interior and an exterior, and has an opening therebetween. The contact assembly includes a terminal contact extending through the opening in the electronic component. The terminal contact has inner and outer ends. A deformable o-ring is positioned about the terminal contact within the opening through the electronic component. A torque generating structure generates a deformable force on the o-ring such that the o-ring seals the opening through the electronic component.

The assembly may also include an inner insulator positioned within the interior of the electronic component adjacent the o-ring. An outer insulator extends about the terminal contact such that the inner insulator and the outer insulator capture the o-ring therebetween. The inner insulator includes an enlarged head positioned in the interior of the electronic component and a neck extending therefrom. The neck is receivable in the opening in the in the electronic component.

It is contemplated that the terminal contact include a radially extending disc projecting therefrom. A torque generating structure, such as a nut, is threadable on the inner end of the terminal contact for compressing the inner and outer insulators between the disc and the nut. It is contemplated form the inner and outer insulator from a high friction resistance material such as polyethermide.

In accordance with a further aspect of the present invention, a terminal contact assembly is provided for mounting to an electronic component. The electronic component has an inner surface defining an interior, an exterior surface and an opening therebetween. The contact assembly includes a terminal contact extending through the opening of the electronic component. The terminal contact has an inner end within the interior of the electronic component and an outer end. A deformable o-ring is positioned about the terminal contact within the opening through the electronic component. An outer insulator is positioned adjacent the exterior surface of the electronic component. An inner insulator extends about the terminal contact. The inner insulator includes a base portion and a neck portion extending into the opening. A torque generating structure generates a deformable force on the o-ring such that the o-ring seals the opening through the electronic component.

The terminal contact includes a radially extending disc projecting therefrom. The torque generating structure includes a nut threadable on the inner end of the terminal for compressing the inner and outer insulators between the disc and the nut. The inner and outer insulator is formed from a high friction resistance material such as polyethermide.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE INVENTION

Figure 1:
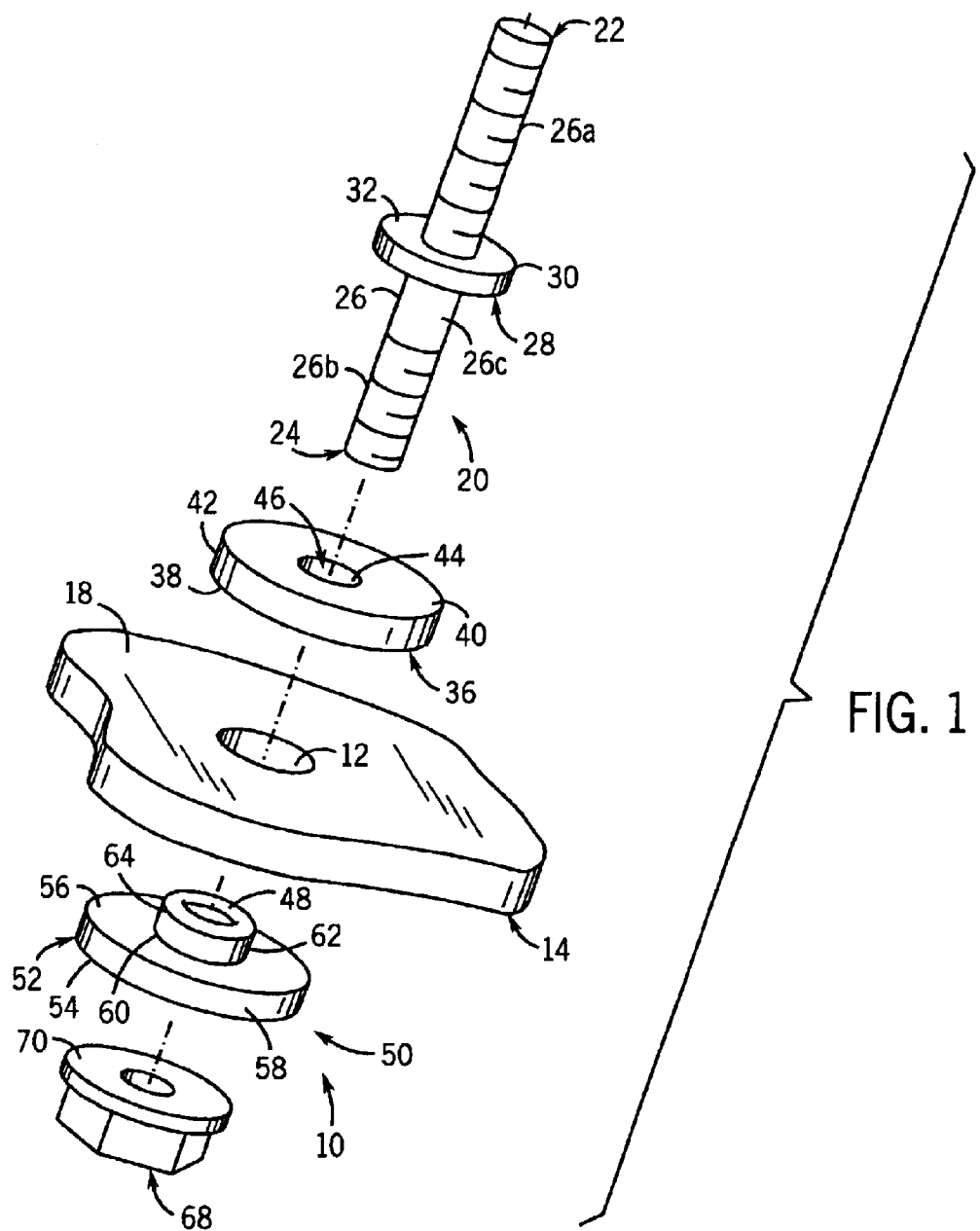
FIG. 1 is an exploded, isometric view of a terminal contact assembly in accordance with the present invention.
Figure 2:
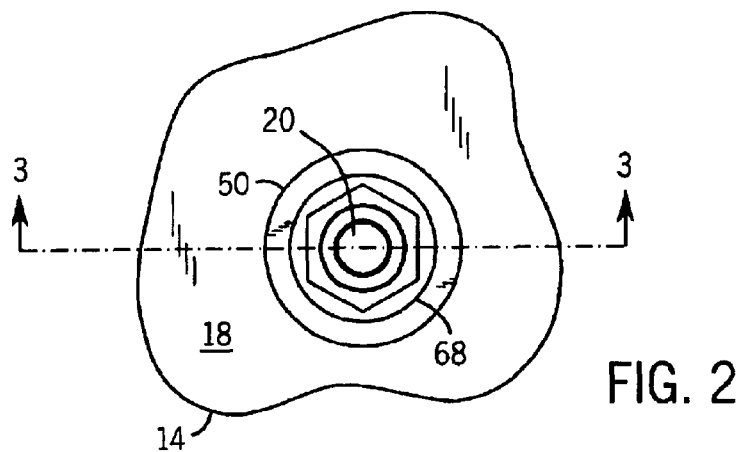
FIG. 2 is a bottom plan view of the terminal contact assembly of the present invention.
Figure 3:
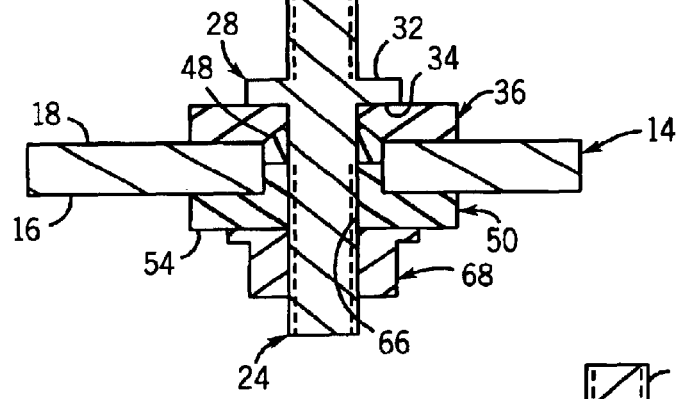
FIG. 3 is a cross-sectional view of the contact assembly of the present invention taken along line 3—3 of FIG. 2.

Referring to FIGS. 1–3, a terminal contact assembly in accordance with the present invention is generally designated by the reference numeral 10. The terminal contact assembly 10 is intended to be mounted within an opening 12 extending through a housing 14 of an electrical component that is particularly adapted to be used in an aerospace vehicle. By way of example, housing 14 includes inner surface 16 defining the interior of the electrical component and outer surface 18 communicating with the environment external of housing 14.

Terminal contact assembly 10 includes terminal 20 having outer end 22 and inner end 24. Terminal 20 is defined by a generally cylindrical outer surface 26. Disc 28 projects radially from outer surface 26 of terminal 20 and terminates at a radially outer edge 30. Outer edge 30 of disc 28 extends between first and second faces 32 and 34.

Outer surface 26 of terminal 20 includes a threaded outer portion 26a extending from outer end 22 of terminal 20 to face 32 of disc 28. In addition, outer surface 26 of terminal 20 includes a threaded inner portion 26b that extends between inner end 24 of terminal 20 and thread-free portion 26c of outer surface 26 of terminal 20. Thread free portion 26c of outer surface 26 of terminal 20 extends between inner portion 26b of outer surface 26 of terminal 20 and face 34 of disc 30.

Terminal contact assembly 10 further includes a generally disc-shaped outer insulator 36 having inner face 38 engageable with outer surface 18 of housing 14 and outer face 40 engageable with face 34 of disc 28. Inner face 38 of outer insulator 36 and outer face 40 of outer insulator 36 are interconnected by radially outer edge 42 and by radially inner edge 44. Inner edge 44 of outer insulator 36 defines an opening 46 through outer insulator 36 for receiving terminal 20 therethrough. It is contemplated that the diameter of opening 46 in outer insulator 36 is generally equal to the diameter of terminal 20 and that outer insulator 36 be formed from a high friction resistance material such as polyethermide.

Terminal contact assembly 10 further includes o-ring 48 and inner insulator 50. It is contemplated to form O-ring from a synthetic rubber and to form insulator 50 from a high friction resistance material such as polyethermide. O-ring 48 has an inner diameter generally equal to the diameter of terminal 20 and an outer diameter generally equal to the diameter of opening 12 in housing 14. Inner insulator 50 includes a disc portion 52 defined by inner face 54 and outer face 56 that is engageable with inner surface 16 of housing 14. Inner face 54 and outer face 56 of disc portion 52 of inner insulator 50 are interconnected by radially outer edge 58. Neck 60 extends from outer face 56 of disc portion 58 of inner insulator 50 and has an outer surface 62. Neck 60 terminates at terminal end 64 and has a diameter generally equal to the diameter of opening 12 through housing 14. Opening 66 extends through inner insulator 50 between inner face 54 of disc portion 52 and terminal end 64 of neck portion 62. Opening 66 through inner insulator 50 has a diameter generally equal to the diameter of terminal 20. Nut 68 is receivable an inner portion 24 of terminal 20 and includes a generally flat insulation engaging face 70 for engaging inner face 54 of disc portion 52 of inner insulator 50, as hereinafter described.

In order to mount terminal contact assembly 10 to housing 14, inner end 24 of terminal 20 is inserted through opening 46 in outer insulator 36 such that outer face 40 of outer insulator 36 engages face 34 of disc 30. Thereafter, inner end 24 of terminal 20 is inserted through opening 12 in housing 14 such that inner face 38 of outer insulator 36 engages outer face 18 of housing 14. As described, outer insulator 36 is captured on thread-free portion 26c of outer surface 26 of terminal 20 between disc 30 and housing 14.

With terminal 20 extending through opening 12 in housing 14, o-ring 48 is slid over inner end 24 of terminal 20 into opening 12 in housing 14 such that the inner diameter of o-ring 48 sealably engages thread-free portion 26c of outer surface 26 of terminal 20 and such that outer diameter of o-ring 48 sealably engages housing 14. Similarly, inner insulator 50 is slid over inner end 24 of terminal 20 such that terminal 30 extends through opening 66 in inner insulator 50. Nut 68 is threaded onto inner end 24 of terminal 20 so as to urge neck 60 of inner insulator 50 into engagement with o-ring 48 in opening 12 through housing 14. As nut 68 is threaded further onto threaded portion 26b of outer surface 26 of terminal 20, o-ring 48 is compressed between inner face 38 of outer insulator 36 and terminal end 64 of neck 60 of inner insulator 50. As a result, the shape of o-ring 48 deforms such that o-ring 48 hermetically seals the interior of housing 14 from the environment outside of housing 14. It can appreciated that due to the compression of frictional resistance between terminal 20, housing 14 and inner and outer insulators 50 and 36, respectively, a low level of assembly torque may be utilized to thread nut 68 onto inner end 24 of terminal 20. This, in turn, reduces the time necessary to mount the terminal contact assembly to housing 14. In addition, the terminal contact assembly 10 of the present invention is capable of better absorbing the mechanical stresses to which an electrical device may be exposed then prior art rigid interlocks produced by soldering, brazing or welding a terminal contact assembly in position.

Figure 4:
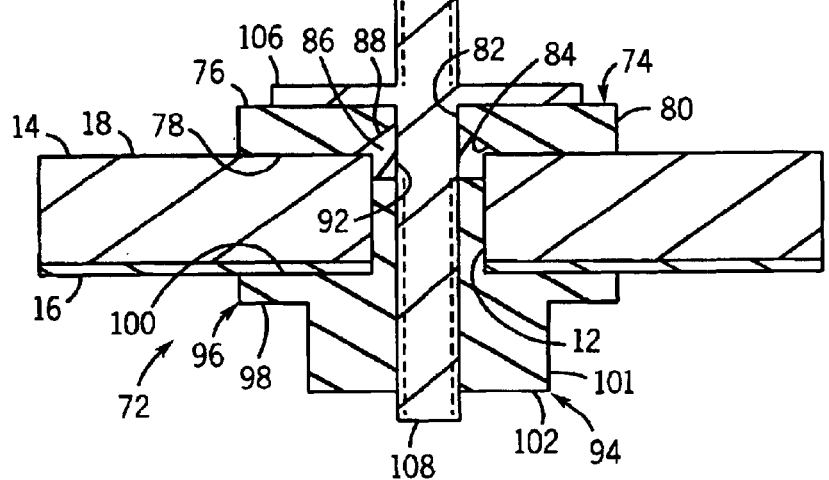
FIG. 4 is a cross-sectional view, similar to FIG. 3, showing an alternate embodiment of the terminal contact assembly of the present invention.

Referring to FIG. 4, an alternate construction of a terminal contact assembly in accordance with the present invention is generally designated by the reference numeral 72. Terminal contact assembly 72 includes common components as terminal contact assembly 10, and as such, common reference characters are used hereinafter to refer to these common components. Similar to terminal contact assembly 10, it is intended that terminal contact assembly 72 be mounted within opening 12 through housing 14. Terminal contact assembly 72 includes a generally disc shaped outer insulator 74 having an outer face 76 and an inner face 78 engageable with outer surface 18 of housing 14. Outer face 76 and inner face 78 of outer insulator 74 are interconnected by a radially outer edge 80 and a radially inner edge 82 that defines an opening therethrough. Recessed surface 84 extends between inner edge 82 and inner face 78 of outer insulator 74 for receiving o-ring 86 therein.

O-ring 86 includes a generally conical outer surface 88 engageable with recess surface 84 of outer insulator 74 and an inner face 90. O-ring 86 has an opening 92 therethrough having a diameter generally equal to the diameter of terminal 20. O-ring 86 has an outer diameter greater than the diameter of opening 12 through housing 14, for reasons hereinafter described.

Terminal contact assembly 72 further includes inner insulator 94. Inner insulator 94 includes a disc portion 96 having an inner face 98 and an outer face 100 engageable with inner face 16 of housing 14. A generally cylindrical inner neck 101 extends from inner face 98 of disc portion 96 and terminates at terminal end 102. Similarly, outer neck 104 extends from outer face 100 of disc portion 96 of inner insulator 94 and terminates at terminal end 106. Neck 104 has an outer diameter generally equal to the diameter of opening 12 through housing 14. Inner insulator 94 further includes an inner surface 108 that defines a passageway 108 extending through inner insulator 94 from terminal end 102 of inner neck 100 to terminal end 106 of outer neck 104 to accommodate terminal 20. It is contemplated to provide threads on inner surface 108 of inner insulator 94 that form a mating relationship with the threads on inner portion 26b of outer surface 26 of terminal 20, for reasons hereinafter described.

In order to mount terminal contact assembly 72 to housing 14, inner end 24 of terminal 20 is inserted through opening in outer insulator 74 such that outer face of outer insulator engages face 34 of disc 30. Inner end 24 of terminal 20 is then inserted through opening 92 in o-ring 86 such that outer surface 88 of o-ring 86 engages recessed surface 84 of outer insulator 74. Thereafter, inner end 24 of terminal 20 is inserted through opening 12 in housing 14 such that inner face 78 of outer insulator 74 engages outer surface 18 of housing 14 and such that o-ring 86 overlaps opening 12 through housing 14.

With terminal 20 extending through opening 12 in housing 14, inner insulator 94 is threaded onto inner portion 26b of outer surface 26 of terminal 20. As inner insulator 94 is threaded further onto terminal 20, o-ring 86 is compressed between recessed surface 84 of outer insulator 74 and outer face 100 of inner insulator 94 such that o-ring 48 deforms within opening 12 and hermetically seals the interior of housing 14 from the environment outside of housing 14. Once again, it can be appreciated that due to the compression friction resistance between outer insulator 74, housing 14, terminal 20 and inner insulator 94, a low level of assembly torque may be utilized to thread inner insulator 94 onto inner end 24 of terminal 20.

As described, it is intended that terminal contact assembly 10 be mounted to an electronic component particularly adapted for use in an aerospace vehicle. It is intended that terminal contact assembly 10 hermetically seal the interior of housing 14 from the exterior thereof when the electronic component is exposed to temperatures ranging from −55° Celsius to 125° Celsius. Further, it is intended that terminal contact assembly 10 maintain its seal within opening 12 in housing 14 as the aerospace vehicle repeatedly cycles between ground and altitudes of up to 80,000 feet above sea level.

Various modes of carrying out the invention are contemplated as being within the scope of the following claims particularly pointing out and distinctly claiming the subject matter which is regarded as the invention.

We claim:

1. A terminal contact assembly for mounting to an electronic component adapted for use in an aerospace vehicle, the electronic component defining an interior and an exterior and having an opening therebetween, the contact assembly comprising:
   a terminal contact positionable within the opening in the electronic component, the terminal contact having inner and outer ends;
   an outer insulator having an inner face engageable with the electronic component and a generally conical recessed surface extending about the terminal contact; and
   a deformable o-ring positioned about the terminal contact within the opening through the electronic component for hermetically sealing the interior of the electronic component, the o-ring having an outer surface engageable with the recessed surface of the outer insulator.

2. The assembly of claim 1 further comprising an inner insulator positioned within the interior of the electronic component adjacent the o-ring.

3. The assembly of claim 1 wherein the inner insulator includes an enlarged head positioned on the interior of the electronic component and neck extending therefrom, the neck being receivable in the opening in the electronic component.

4. The assembly of claim 2 wherein the terminal contact includes a radially extending disc projecting therefrom.

5. The assembly of claim 4 further comprising a torque generating structure engageable with the inner and the outer insulation for generating a deforming force on the o-ring.

6. The assembly of claim 5 wherein the torque generating structure includes a nut threadable on the inner end of the terminal contact for compressing the inner and the outer insulation between the disc and the nut.

7. A terminal contact assembly for mounting to an electronic component defining an interior and an exterior and having an opening therebetween, the contact assembly comprising:
   a terminal contact extending through the opening in the electronic component, the terminal contact having inner and outer ends;
   a deformable o-ring having an outer surface and being positioned about the terminal contact within the opening through the electronic component;
   an inner insulator positioned within the interior of the electronic component adjacent the o-ring; and
   an outer insulator having a generally conical recessed surface engageable with the outer surface of the o-ring and extending about the terminal contact, the outer insulator and the inner insulator capturing the o-ring therebetween; and
   a torque generating structure for generating a deforming force on the o-ring such that the o-ring seals the opening through of the electronic component.

8. The assembly of claim 7 wherein the inner insulator includes an enlarged head positioned on the exterior of the electronic component and a neck extending therefrom, the neck being receivable in the opening in the electronic component.

9. The assembly of claim 7 wherein the terminal contact includes a radially extending disc projecting therefrom.

10. The assembly of claim 9 wherein the torque generating structure includes a nut threadable on the inner end of the terminal contact for compressing the inner and outer insulators between the disc and the nut.

11. The assembly of claim 9 wherein the inner insulator is formed from a high friction resistance material.

12. A terminal contact assembly for mounting to an electronic component, the electronic component having an inner surface defining an interior, an exterior surface and an opening therebetween, the contact assembly comprising:

a terminal contact extending through the opening in the electronic component, the terminal contact having inner end within the interior of the electrical component and an outer end;

a deformable seal positioned about the terminal contact within the opening through the electronic component;

an outer insulator positioned adjacent the exterior surface of the electronic component, the outer insulator having a generally conical recessed surface extending about the terminal contact;

an inner insulator extending about the terminal contact, the inner insulator including a base portion and a neck portion extending into the opening; and a torque generating structure for generating a deforming force on the seal such that the seal engages the recessed surface of the outer insulator and seals the opening through the electronic component.

13. The assembly of claim 12 wherein the terminal contact includes a radially extending disc projecting therefrom.

14. The assembly of claim 13 wherein the torque generating structure includes a nut threadable on the inner end of the terminal contact for compressing the inner and outer insulators between the disc and the nut.

15. The assembly of claim 12 wherein the inner insulator is formed from a high friction resistance material.

* * * * *